UNITED STATES PATENT OFFICE.

MILLARD STEWART HUDNALL, OF WICHITA FALLS, TEXAS.

PROCESS OF MAKING LUBRICANTS.

SPECIFICATION forming part of Letters Patent No. 670,783, dated March 26, 1901.

Application filed May 5, 1900. Serial No. 15,640. (No specimens.)

*To all whom it may concern:*

Be it known that I, MILLARD STEWART HUDNALL, a citizen of the United States, and a resident of Wichita Falls, in the county of Wichita and State of Texas, have invented a new and Improved Process of Manufacturing a Lubricant, of which the following is a full, clear, and exact description.

My invention relates to the manufacture of lubricating compounds, and has for its object to provide an improved process for making a lubricant especially adapted for parts of moving machinery which will be efficient to keep said parts and their bearings cool and which may also be used to cool heated journals and bearings.

My invention consists in the novel process of making the lubricant, as hereinafter described and claimed.

The compound contains the following ingredients in about the proportions stated: lime, two and one-half pounds; signal-oil, one quart; black oil, one gallon; soap, two and three-fourths pounds; water, five pints.

To prepare the compound, I proceed as follows: I take two and one-half pounds of air-slaked lime (sifted) and add to it one quart of signal-oil, stirring the mixture until all of the dry lime disappears. The lime and oil form an emulsion of a translucent appearance. Then I add one gallon of black oil and stir again, whereupon the mixture is heated moderately—say to about 100° Fahrenheit. I also prepare separately a solution of two and three-fourths pounds of common bar-soap in five pints of water, by boiling, and when the soap has become fully dissolved I pour the boiling hot solution into the lime and oil mixture first described and stir well until the mixture sets. After cooling the compound is ready for use.

"Signal-oil" is an illuminating-oil well known under that name and used extensively, upon railroads for filling signal-lanterns. It contains some product of petroleum.

Black oil is a product of petroleum which is used for lubricating purposes on cars and machinery and is also known under the name of "car-oil." There are many grades of black oil upon the market and I may use any one of them for the purposes of my invention.

The lubricant prepared as above described is at ordinary temperature paste of viscous consistency, about the same consistency as soft soap and of a brown or dark-yellow color.

By heating the lubricant can be liquefied, so that it can be poured through oil-holes; but upon cooling it will again become soapy or unctuous.

The lubricant is of great efficiency for cooling hot boxes, journals, and other parts of machinery and for preventing the heating of such parts.

Having thus fully described my invention, I claim as new and desire to secure by Letters Patent—

The herein-described process of manufacturing a lubricant, which consists in adding signal-oil to slaked lime, until the lime emulsifies, then adding black oil, heating the mixture, and finally pouring into it, a hot soap solution, substantially as described.

In testimony whereof I have signed my name to this specification in the presence of two subscribing witnesses.

MILLARD STEWART HUDNALL.

Witnesses:
HENRY A. SADLER,
CLAUDE TAYLOR.